US012010751B1

(12) United States Patent
Mariyani et al.

(10) Patent No.: US 12,010,751 B1
(45) Date of Patent: Jun. 11, 2024

(54) SELECTING VOICE OVER NEW RADIO OR EVOLVED PACKET SYSTEM FALLBACK

(71) Applicant: T-Mobile Innovations LLC, Overland Park, KS (US)

(72) Inventors: Anil Kumar Mariyani, Ashburn, VA (US); Rajil Malhotra, Olathe, KS (US); Anuj Sharma, Broadlands, VA (US); Chris Jensen, Snoqualmie, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 57 days.

(21) Appl. No.: 17/462,599

(22) Filed: Aug. 31, 2021

(51) Int. Cl.
*H04W 76/25* (2018.01)
*H04W 28/02* (2009.01)
*H04W 28/12* (2009.01)
*H04W 76/30* (2018.01)

(52) U.S. Cl.
CPC ....... *H04W 76/25* (2018.02); *H04W 28/0284* (2013.01); *H04W 28/12* (2013.01); *H04W 76/30* (2018.02)

(58) Field of Classification Search
None
See application file for complete search history.

(56) References Cited

U.S. PATENT DOCUMENTS

| | | | | |
|---|---|---|---|---|
| 6,134,314 | A * | 10/2000 | Dougherty | H04W 8/02 455/433 |
| 11,019,537 | B2 * | 5/2021 | Chiang | H04W 36/0022 |
| 11,166,130 | B1 * | 11/2021 | Manchanda | H04W 76/15 |
| 2019/0394683 | A1 * | 12/2019 | Sillanpaa | H04W 36/32 |
| 2021/0168684 | A1 * | 6/2021 | Kang | H04W 36/08 |
| 2021/0258842 | A1 * | 8/2021 | Fiorese | H04W 36/36 |
| 2021/0410020 | A1 * | 12/2021 | Patil | H04W 36/32 |

* cited by examiner

*Primary Examiner* — Lonnie V Sweet
(74) *Attorney, Agent, or Firm* — Shook, Hardy & Bacon L.L.P.

(57) ABSTRACT

Systems, methods, and computer-readable media are described herein to which dynamically provide indications within a database that a monitored communication protocol is congested or otherwise unavailable. Key performance indicators are monitored on a first wireless communication protocol to determine if it is congested. Once the congestion is determined, the database is updated, and a terminating call application server may then receive an indication that the first wireless communication protocol is congested and may suggest to another communication protocol.

20 Claims, 5 Drawing Sheets

SELECTING VOICE OVER NEW RADIO OR EVOLVED PACKET SYSTEM FALLBACK

SUMMARY

A high-level overview of various aspects of the present disclosure is provided here to introduce a selection of concepts further described below in the detailed description. This summary is not intended to identify key features or essential features of the claimed subject matter, nor is it intended to be used as an aid in isolation to determine the scope of the claimed subject matter.

In brief and at a high level, the present disclosure describes, among other things, systems, methods, and computer-readable media that employ communication protocol, congestion, and performance information to inform a network about a congestion and poor performance, such that a request to terminate a call on the communication protocol can be redirected or a fallback communication protocol may be preferred.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF SEVERAL VIEWS OF THE DRAWINGS

Illustrative embodiments of the present disclosure are described in detail below with reference to the attached drawing figures, and wherein.

DETAILED DESCRIPTION

Figure 1:
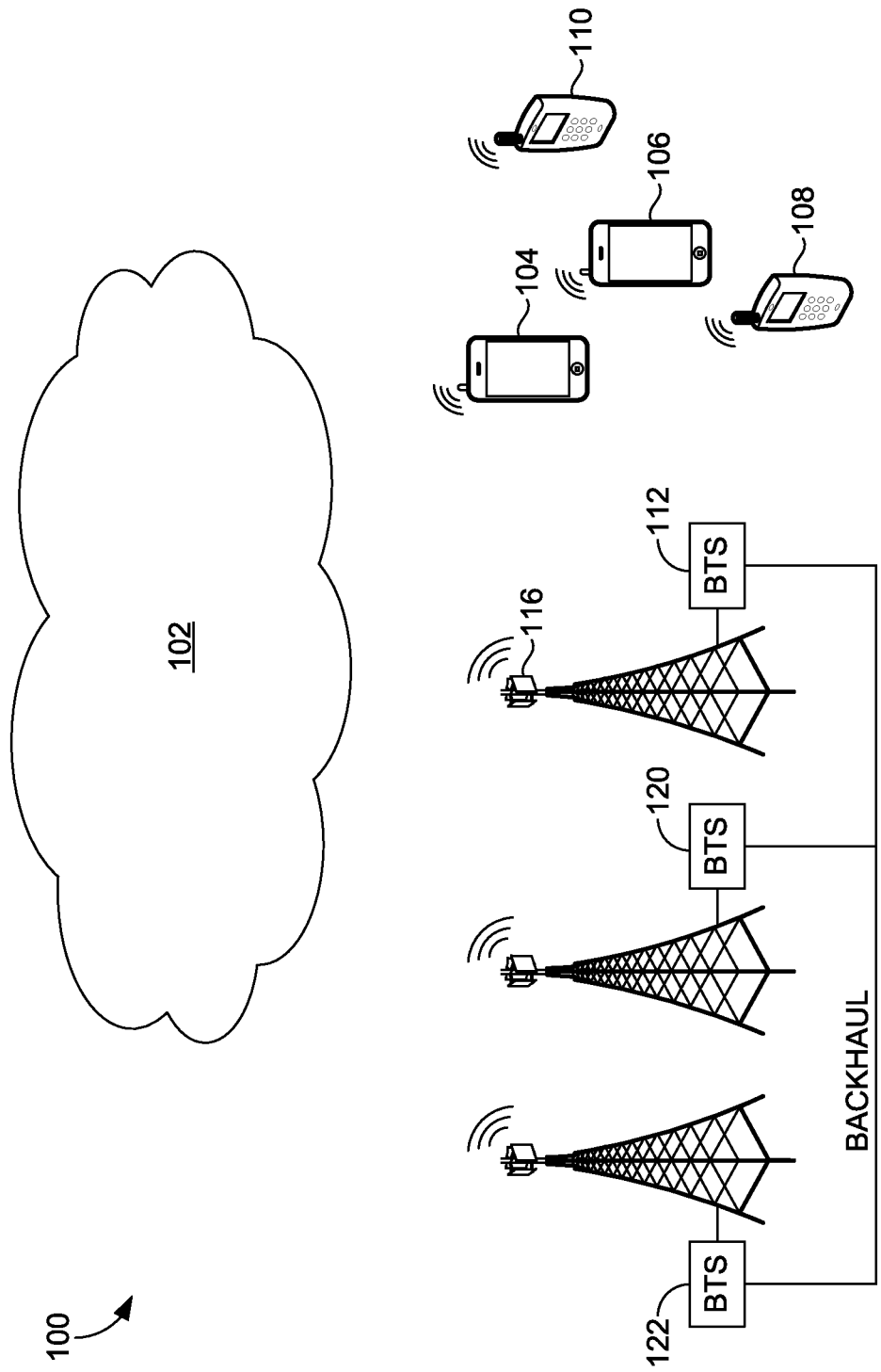
FIG. 1 depicts a an exemplary network environment, in accordance with an embodiment of the present disclosure.

The subject matter of select embodiments of the present disclosure are described with specificity herein to meet statutory requirements. The detailed description is not intended to define what is regarded as the invention, which is the purpose of the claims. The claimed subject matter might be embodied in other ways to include different steps or combinations of steps similar to the ones described herein, in conjunction with other present or future technologies. Terms should not be interpreted as implying any particular order among or between various steps described herein unless and except when the order of individual steps is explicitly described.

Throughout the description of the present disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present disclosure. The following is a list of these acronyms:

| | |
|---|---|
| AWS | Advanced Wireless Services |
| BRS | Broadband Radio Service |
| BTS | Base Transceiver Station |
| CDMA | Code Division Multiple Access |
| EBS | Educational Broadband Services |
| eNodeB | Evolved Node B |
| EVDO | Evolution-Data Optimized |
| gNodeB | Next Generation Node B |
| GPS | Global Positioning System |
| GSM | Global System for Mobile Communications |
| HRPD | High Rate Packet Data |
| eHRPD | Enhanced High Rate Packet Data |
| LTE | Long Term Evolution |
| LTE-A | Long Term Evolution Advanced |
| PCS | Broadband Personal Communications Service |
| RNC | Radio Network Controller |
| SyncE | Synchronous Ethernet |
| TDM | Time-Division Multiplexing |
| VOIP | Voice Over Internet Protocol |
| WAN | Wide Area Network |
| WCS | Wireless Communications Service |
| WiMAX | Worldwide Interoperability for Microwave Access |

Further, various technical terms are used throughout the detailed description. Definitions of such terms can be found in, for example, Newton's Telecom Dictionary by H. Newton, 31st Edition (2018). These definitions are intended to provide a clear understanding of the ideas disclosed herein but are not intended to limit the scope of the present disclosure. The definitions and terms should be interpreted broadly and liberally to the extent allowed by the meaning of the words offered in the above-cited reference.

Embodiments of the technology may be implemented as, among other things, a method, system, or computer-program product. Accordingly, the embodiments may take the form of a hardware embodiment, or an embodiment combining software and hardware. In one embodiment, the present disclosure takes the form of a computer-program product that includes computer-useable instructions embodied on one or more computer-readable media.

Computer-readable media includes volatile and/or non-volatile media, removable and non-removable media, and contemplates media readable by a database, a switch, and various other network devices. Network switches, routers, and related components are conventional in nature, as are the means of communicating with the same. By way of non-limiting example, computer-readable media comprises computer storage media and/or communications media. Computer storage media, or machine-readable media, includes media implemented in any method or technology for storing information. Examples of stored information includes computer-useable instructions, data structures, program modules, and other data representations. Computer storage media includes RAM, ROM, EEPROM, flash memory or other memory technology, CD-ROM, digital versatile discs (DVDs), holographic media or other optical disc storage, magnetic cassettes, magnetic tape, magnetic disc storage, and/or other magnetic storage devices. These memory components can store data momentarily, temporarily, or permanently. Computer storage media does not encompass a transitory signal, in embodiments of the present disclosure.

Communications media typically store computer-useable instructions, including data structures and program modules, in a modulated data signal. The term "modulated data signal" refers to a propagated signal that has one or more of its characteristics set or changed to encode information associated therewith. The communications media includes any information-delivery media. By way of non-limiting example, the communications media includes wired media, such as a wired network or a direct-wired connection, and a wireless media, such as acoustic, infrared, radio, microwave, spread-spectrum, and other wireless media technologies. Combinations of the above are included within the scope of the computer-readable media.

At a high level, systems, methods, and computer-readable media described herein identify congested wireless communication protocols, such that calls can be redirected or such that an IP multimedia subsystem (IMS) core or an application server (AS) can implement alternative protocols for terminating the call. Presently, there is no way to inform a unified data management module (UDM) if there are any congested communication protocols in its serving area. However, an access mobility function (AMF) has the ability to notify the UDM if the AMF is going down for maintenance. A request to terminate a call will cause the terminating call AS, that is responsible for terminating the call, to query the UDM that will in turn query the AMF. When presented with congestion and related performance issues, the request to terminate the call with a particular communication protocol may experience call termination issues. These issues may be presented as dropped calls or calls going to voicemail because of a timeout issue or other issues related to the congestion or performance. For instance, by the time a request to terminate the call has attempted to query the AMF of the communication protocol and receives information that the protocol is unavailable, a time limit may have been reached and the call will go to voicemail. This issue can be averted by directing the request to a fallback communication protocol rather than attempting to terminate the call on the original communication protocol.

In a first aspect of the present disclosure, a method is provided. The method comprises monitoring a status of a first wireless communication protocol associated with a base transceiver station. The method further comprises identifying the status of the first wireless commutation protocol, wherein the status identified is unavailable. The method further comprises receiving a request to terminate a call over the first wireless communication protocol. The method further comprises, in response to the request and the unavailable status of the first wireless communication protocol, communicating that the first wireless communication protocol is unavailable and that the call request should be submitted via a second wireless communication protocol.

In a second aspect of the present disclosure, computer-readable media is provided. The computer-readable media includes computer-executable instructions embodied thereon that, when executed, perform a method. In accordance with the method executed by the media, a status of a first wireless communication protocol associated with a base transceiver station is monitored. The method further comprises identifying the status of the first wireless commutation protocol, wherein the status identified is unavailable. The method further comprises receiving a request to terminate a call over the first wireless communication protocol. The method further comprises, in response to the request and the unavailable status of the first wireless communication protocol, communicating that the first wireless communication protocol is unavailable and that the call request should be submitted via a second wireless communication protocol.

In a third aspect of the present disclosure, a system is provided. The system comprises a processor configured to monitor a status of a first wireless communication protocol associated with a base transceiver station. The system further comprises identifying the status of the first wireless commutation protocol, wherein the status identified is unavailable. A request to terminate a call over the first wireless communication protocol is received. The system further comprises in response to the request and the unavailable status of the first wireless communication protocol, communication that the first wireless communication protocol is unavailable and that the call request should be submitted via a second wireless communication protocol.

Referring to FIG. 1, an example of a network environment 100 suitable for use in implementing embodiments of the present disclosure is illustrated. The network environment 100 is illustrated as an example of a suitable network environment and is not intended to suggest any limitation as to the scope of use or functionality of the present disclosure. Neither should the network environment 100 be interpreted as having any dependency or requirement relating to any one or combination of components illustrated.

The network environment 100 includes a network 102 that provides service to current User Equipment (UE) 104 and 106, and one or more legacy UE 108 and 110. The network 102 may be accessible through a base transceiver station 112 that is connected to a backhaul server (not shown). The base transceiver station 112 and/or a computing device (for example, local or remote device) associated with the base transceiver station 112 may manage or otherwise control operation of components of a cell site, including an antenna array 116. The base transceiver station 112 and/or the computing device associated with the base transceiver station 112 may include one or more processors and computer-readable storage media having computer-executable instructions or computer instruction modules embodied thereon for execution by the one or more processors.

The antenna array 116 may radiate in a particular direction and, thus, may correspond to a particular sector of the cell site. In some embodiments, the antenna array 116 may have a plurality of antenna elements. In one embodiment, the antenna array 116 is configured to have a plurality of elements that in number, arrangement, and/or density, are configured for massive Multiple-in Multiple-out (mMIMO) configuration. In one such embodiment, the base transceiver station 112 may include a radio and/or a controller, such as a Massive Multiple-Input Multiple-Output Unit for controlling a mMIMO configured antenna array, such as the antenna array 116 having the plurality of antenna elements. The base transceiver station 112 may use the controller to monitor one or more of throughput, signal quality metrics (for example, signal-to-interference-plus-noise ratio (SINR)), number of unique users/subscribers, number of unique UE(s), and/or remote location filings that occur at the base transceiver station 112, all of which may be monitored dynamically and/or stored in a data store. The antenna array 116 may also be configured to operate under a lower order number of antenna elements than an antenna array configured to operate under a mMIMO configuration. Such a lower order configuration may be a legacy system, such as an eight branch transmit and eight branch receive (8T8R) antenna structure.

The base transceiver station 112 may use a radio that is connected to the antenna array 116 by a physical RF path, where the radio is used to cause the antenna array 116 to transmit radio-frequency signals using the plurality of antenna elements. The plurality of antenna elements in the antenna array 116 may include portions of antenna elements (not shown). In embodiments, the plurality of antenna elements of the antenna array 116 may be partitioned such that a first portion of antenna elements may be associated with, dedicated to, correspond to, and/or be configured to operate using a first access technology, and a second portion of antenna elements may be associated with, dedicated to, correspond to, and/or be configured to operate using a second access technology. In one embodiment, the plurality of antenna elements may be partitioned into unequal groups or, alternatively, "split" into equal halves, wherein each group or half operates to provide a coverage area for a distinct access technology when the antenna array 116 operates in a dual technology mode.

In some embodiments, the antenna array 116 is partitioned such that the first portion of antenna elements is associated with the first access technology and the second portion of antenna elements is associated with the second access technology. In some embodiments, when the antenna array 116 is operating in a dual technology mode, each portion of the plurality of antenna elements may operate using only one distinct protocol and/or access technology relative to the other portions in the antenna array 116. In one example, the first portion of antenna elements may operate using 5G wireless access technology and the second portion of antenna elements may operate using 4G wireless access technology. Additionally, it will be understood that the terms "first" and "second" are used herein for the purpose of clarity in distinguishing portions of antenna elements from one another, but the terms are not used herein to limit the sequence, relevance, number of portions, technological functions, and/or operations of each portion unless specifically and explicitly stated.

As such, the base transceiver station 112 may provide the current UE 104 and 106 and the legacy UE 108 and 110 with access to the network 102. In some embodiments, the first portion of antenna elements may communicate with the current UE 104 and 106 using the 5G wireless access technology, and the second portion of the antenna elements may communicate with the legacy UE 108 and 110 using the 4G wireless access technology. When operating in a dual technology mode, the antenna array 116 may concurrently connect to and communicate with the current UE 104 and 106 and the legacy UE 108 and 110 using, respectively, at least two distinct access technologies.

Accordingly, in one example, when the antenna array 116 is operating in the dual technology mode, the base transceiver station 112 concurrently acts an eNodeB (or "eNB") and gNodeB (or "gNB"). As such, the base transceiver station 112 may provide service to one or more access technologies to both the current and the legacy UE. In addition to communicating with the current UE 104 and 106 and the legacy UE 108 and 110, the base transceiver station 112 may also communicate with one or more neighboring base transceiver stations. In some embodiments, the base transceiver station 112 may communicate with neighboring base transceiver station 120 using the first access technology and may communicate with another neighboring base transceiver station 122 using the second access technology. For example, since the base transceiver station 112 may operate concurrently as the eNodeB and the gNodeB using the antenna array 116 that is partitioned and operating in the dual technology mode, the base transceiver station 112 may communicate with other base transceiver stations, such as the neighboring base transceiver stations 120 and 122. For example, base transceiver station 112 communication may include legacy base transceiver stations that cannot use current access technologies (for example 5G) or current base transceiver stations that lack backward compatibility with prior access technologies (for example 4G). In some embodiments, the base transceiver station 112 may bi-directionally exchange information with the neighboring base transceiver stations 120 and 122 through an X2 interface or X2 link. Information regarding signal quality, RF conditions, one or more RLFs, and SINR levels at each of the neighboring base transceiver stations 120 and 122, and/or as reported from UE to the neighboring base transceiver stations 120 and 122, may be communicated to the base transceiver station 112 via the X2 link. Additionally, or alternatively, information regarding signal quality, RLFs, and SINR levels at each of the neighboring base transceiver stations 120 and 122 may be communicated to the base transceiver station 112 over a backhaul.

As mentioned, the base transceiver station 112 may include a radio and/or a controller, such as a memory management unit (MMU), that enables the base transceiver station 112 to adjust or modify the operations and transmissions of the plurality of antenna elements in the antenna array 116. In some embodiments, the operations, configurations, and/or settings of each antenna element may be individually controlled and adjusted by the base transceiver station 112 using the controller. In some embodiments, the operations, configurations, and/or settings of the first portion of antenna elements may be controlled and adjusted as a group by the base transceiver station 112 using the controller, such as the MMU, independent of the second portion of antenna elements. In a similar fashion, the operations, configurations, and/or settings of the second portion of antenna elements may be controlled and adjusted as a group by the base transceiver station 112 using the controller, independent of the first portion of antenna elements. Accordingly, the base transceiver station 112 may use the controller to independently adjust different groups or portions of antenna elements within one antenna array, such as the antenna array 116.

In embodiments, the operations, configurations, and/or settings of each individual antenna element may be adjusted and customized. For example, the base transceiver station 112 instructs a portion of antenna elements to transmit one or more synchronization signals using a periodicity. In another example, the portion of antenna elements may transmit a plurality of synchronization signals using the periodicity, as instructed by the base transceiver station 112. In some embodiments, the synchronization signals may be specific to and/or configured for the first access technology.

Accordingly, the base transceiver station 112 may use the controller to independently adjust different individual antenna elements, any number of groupings and/or subset(s) of each portion of antenna elements, and/or portions of antenna elements within one antenna array, such as the antenna array 116. In some embodiments, the base transceiver station 112 may use the controller to measure and monitor one or more of throughput, signal quality metrics (for example, SINR), number of unique users/subscribers, number of unique UE, and/or RLFs.

Figure 2:
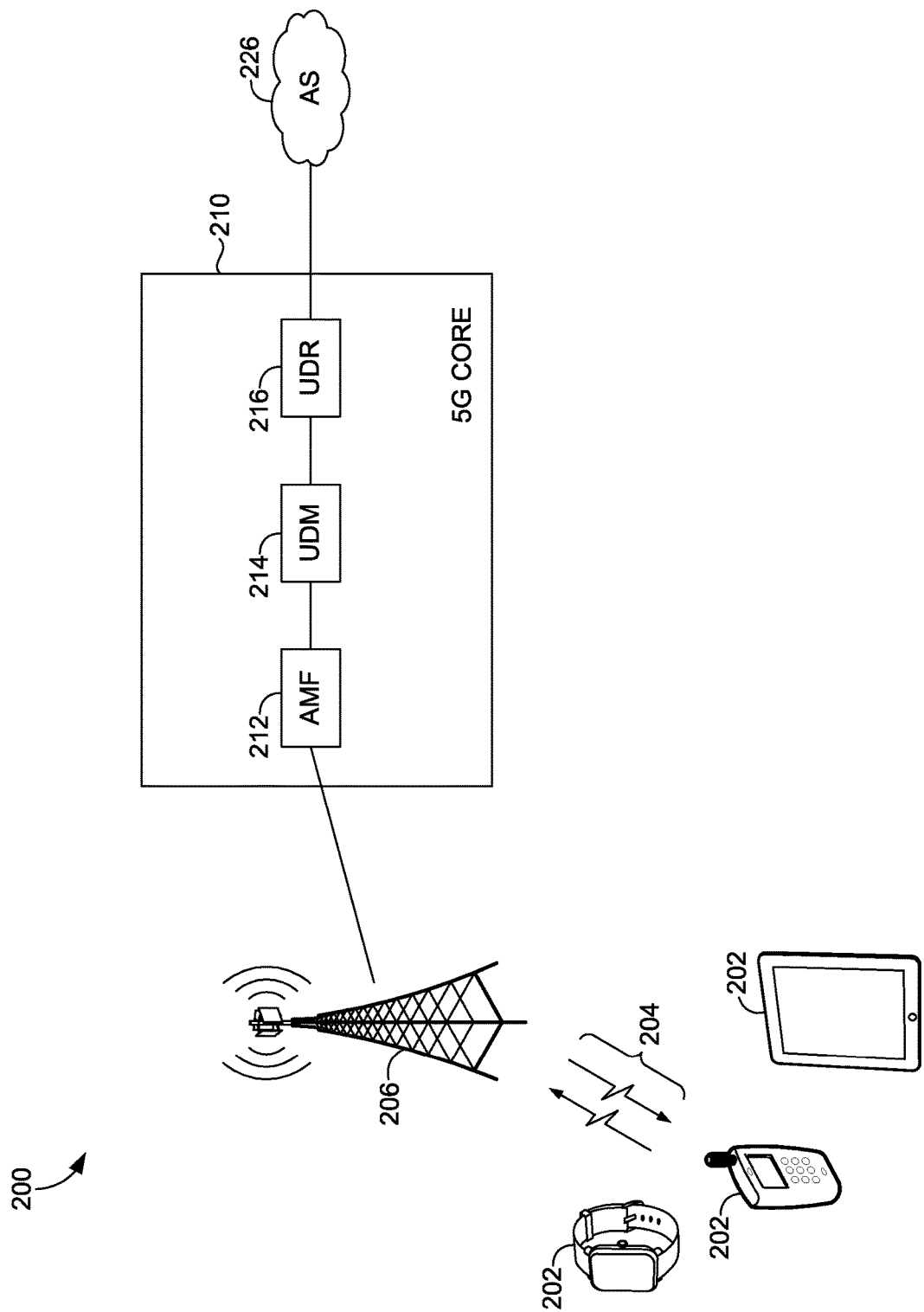
FIG. 2 depicts an exemplary telecommunications environment, in accordance with an embodiment of the present disclosure.

Referring to FIG. 2, an exemplary network environment 200 is illustrated in which implementations of the present disclosure may be employed. The network environment 200 is one example of a suitable network environment and is not intended to suggest any limitation as to the scope of use or functionality of the present disclosure. Neither should the network environment 200 be interpreted as having any dependency or requirement relating to any one or combination of components illustrated.

The network environment 200 represents a high level and simplified view of relevant portions of a modern wireless telecommunication network. At a high level, the network environment 200 may generally include one or more UEs, such as a first UE 202, a first wireless communication protocol (FCP) 206, and a network core 210, though in some implementations, it may not be necessary for certain features to be present. The network environment 200 is generally configured for wirelessly connecting the first UE 202 with other UEs and with other telecommunication networks, such as a publicly-switched telecommunication network (PSTN), or data or services that may be accessible on one or more application servers or other functions, nodes, or servers not illustrated in FIG. 2, so as to not obscure the focus of the present disclosure. As illustrated generally, the first UE 202 may take any number of forms, including a tablet, phone, or wearable device, or any other device discussed with respect to FIG. 1. In some aspects, the first UE 202 may specifically not be a conventional telecommunications device (for example, device that is capable of placing and receiving voice calls) but may instead take the form of a device that only utilizes wireless network resources in order to transmit or receive data. Such devices may include IoT devices (for example, smart appliances, thermostats, locks, smart speakers, lighting devices, smart receptacles, and the like).

The FCP 206 is generally configured to transmit and receive one or more signals 204 between a base transceiver station (such as the base transceiver station 112 in FIG. 1) and the first UE 202. The FCP 206 is configured to receive one or more signals 204 from the first UE 202, and the one or more signals 204 may be implemented as uplink signals. In response to receiving certain requests from the first UE 202, the FCP 206 may communicate with the network core 210. For example, in order for the first UE 202 to connect to a desired network service (for example, PSTN call, voice over LTE (VoLTE) call, voice over new radio (VoNR), data, or the like), the first UE 202 may communicate an attach request to the FCP 206, which, in response, may communicate a registration request to the network core 210. The FCP 206 may take the form of a home network (for example, a FCP belonging to or affiliated with a carrier associated with the first UE 202) or a visiting/roaming network (for example, a FCP belonging to or operated by an entity other than the carrier associated with the first UE 202, but which, in certain conditions, may provide extended wireless access to the first UE 202 beyond the reach of the home network). Further, though the FCP 206 is illustrated as a single wireless access point, the FCP 206 may comprise a multi-hop wireless system, in itself; for example, the FCP 206 may comprise a small cell or relay, to which the first UE 202 is connected and a backhaul access point (for example, an eNodeB or gNodeB).

Relevant to the present disclosure, one or more modules of the network core 210 may work cooperatively to determine whether the first UE 202 is authorized to access the desired network service. As used herein, the terms "function" and "module" are used to describe a computer processing component and/or one or more computer executable services being executed on the one or more computer processing components. For example, the network core 210 may comprise modules or functions that include any one or more of a core access and mobility management function (AMF) 212, a unified data management module (UDM) 214, a unified data repository (UDR) 216, and a user plane function (HSS). Notably, the preceding nomenclature is used with respect to the 3GPP 5G architecture; in other aspects, each of the preceding functions and/or modules may take different forms, including consolidated or distributed forms that perform the same general operations. For example, the AMF 212 in the 3GPP 5G architecture is configured for various functions relating to security and access management and authorization, including registration management, connection management, paging, and mobility management; in other forms, such as a 4G architecture, the AMF 212 of FIG. 2 may take the form of a mobility management entity (MME). The network core 210 may be generally said to authorize rights to and facilitate access to the first UE 202 requested by an application server (AS)/application service 226.

The network environment 200 comprises a unified data repository (UDR) 216 for storing information relating to access control. The UDR 220 is generally configured to store information relating to subscriber information and access, and may be accessible by multiple different application servers, such as application servers for VoNR or VoLTE or other communication protocols. For example, the UDR 220 may be accessed by the AMF 212 in order to convey information related to the status of the FCP 206. The status information is directed to the UDR 220 such that the status information is provided to inquire HSS modules. For example, a request to terminate a call to UE 202 may come in through the application server (AS) 226 of the requesting user in the form of a request to terminate a call over the FCP 206. The request will then be routed to the UDR 216 to retrieve information and forward the call to the UDM 214 in order to complete the call request. Once the request queries the UDR 216 regarding the FCP 206, the UDR 216 will then be able to provide information to the AS 226 that the FCP 206 is unavailable or congested. The AS 226 will then be able to enact alternate call protocols and may redirect the call termination request through another communication protocol and not through the FCP 206.

Figure 3:
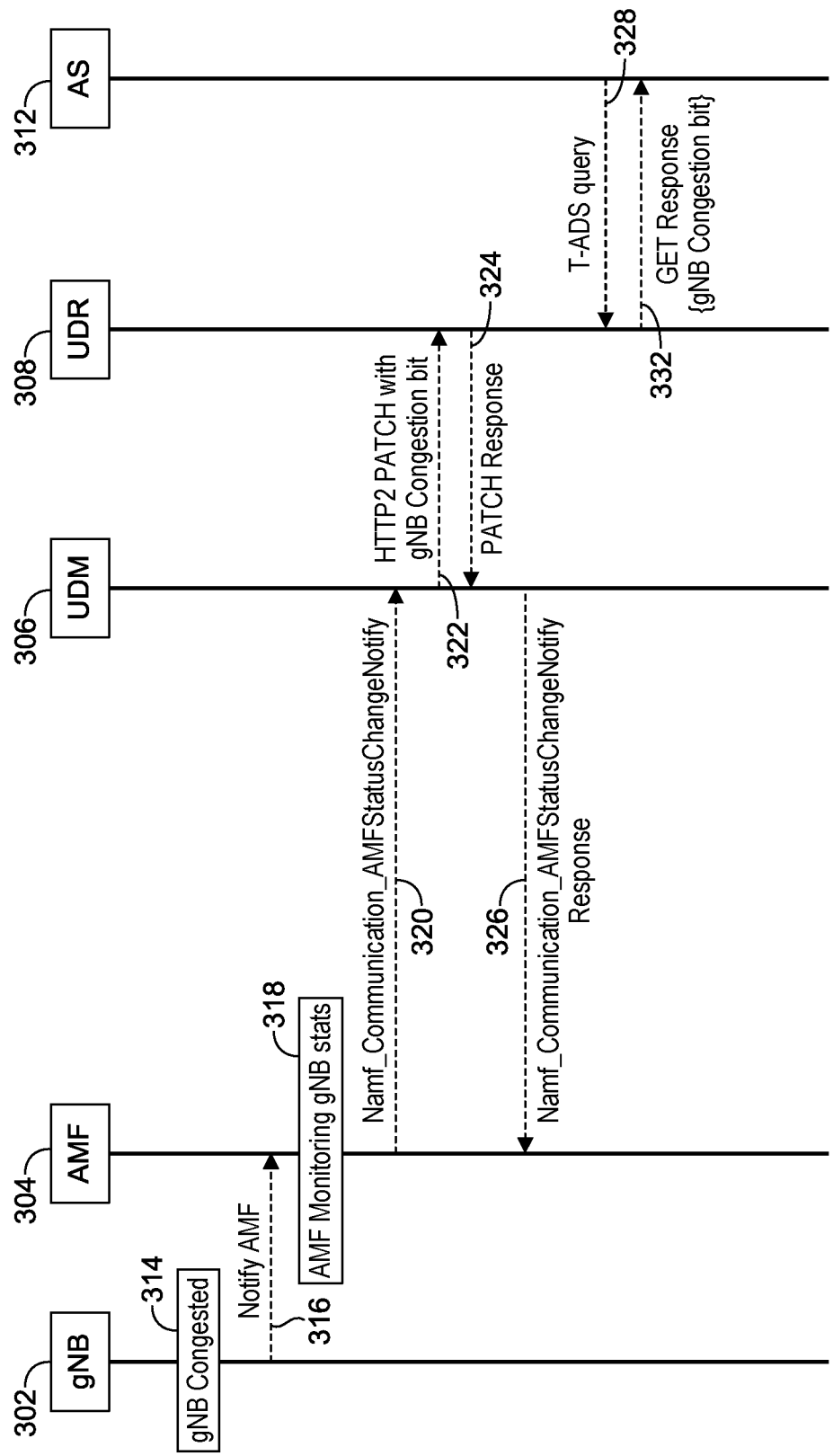
FIG. 3 depicts a message diagram of an exemplary method in which implementations of the present disclosure may be employed.

Referring to FIG. 3, a call flow diagram is illustrated in accordance with one or more aspects of the present disclosure. A call flow 300 may be said to exist between one or more components discussed in greater detail herein and is not meant to exhaustively show every interaction that would be necessary to practice the invention, so as to not obscure the inventive concept but is instead meant to illustrate one or more potential interactions between components. The call flow 300 may be relevantly said to include a gNB 302 (such as the first FCP 206 of FIG. 2), an AMF 304 (such as the AMF 212 of FIG. 2), a UDM 306 (such as the UDM 214 of FIG. 2), a UDR 308 (such as the UDR 216 of FIG. 2), and an AS 312 (such as the AS 226 of FIG. 2). At a first step 314, the gNB 302 is determined to be congested or have an "unavailable" status. In some embodiments the FCP represented by the gNB 302 may be a different communication protocol, such as VoLTE or any other communication protocol. The gNB 302 is determined to be unavailable based on the monitoring of one or more key performance indicators (KPI). Such KPIs may include, but are not limited to, attachment rates, handover failures, throughput, data usage, or other performance indicators related to call functions and call termination. At a second step 316, the gNB 302 notifies the AMF 304 of the unavailability of the gNB 302 due to congestion or some other disabling event. In other embodiments, step 318 provides that the AMF 304 monitors the gNB 302 to identify the availability status of the gNB 302.

At a step 320, the AMF 304 provides a communication to the UDM 306 with information related to a status change of the AMF 304. The AMF 304 will indicate that the status is changing from available or uncongested to unavailable or congested. This notification to the UDM 306 is in response to the determination that the gNB 302 is otherwise unavailable. The AMF 304 is able to instruct the UDM 306 that it will be unavailable to process transactions by providing a globally unique AMF identifier (GUAMI) configured for the AMF 304. The notification at step 320 may take the form of "Namf_Communication_AMFStatusChangeNotify" command that is a command for the UDM 306 to facilitate the change in the UDR 308. In response to the notification in step 320, the UDM 306 provides a response 326 to AMF 304 indicating that the AMF 304 status change has been received and/or changed in the UDR 308. The response notification 326 may take the form of "Namf_Communication_AMFStatusChangeNotify Response" command that is a command from the AMF 304 to provide an indication that the notification at step 320 has been received and/or the status has been changed in the UDR 308.

At step 322, the UDM 306 updates the UDR 308 with an AMF/gNB congestion bit. The AMF/gNB congestion bit provides an indication to the UDR 308 that the AMF 304 is congested or otherwise unavailable to receive a termination call request. At step 328, the AS 312 queries the UDR 308 with a terminating access domain request query. This is a request to terminate a call on AMF 304 to gNB 302. The query to the UDR 308 may include an HTTP2 GET request to retrieve information related to the gNB 302, the AMF 304, and the terminating call request. In response to the query of step 328, the UDR 308 provides a response at step 332. The response includes a gNB congestion bit and/or a bit indication that the AMF 304 and/or the gNB 302 is congested or otherwise unavailable. The AS 312 receives information indicating that the IMS voice over is not supported at that time such that the AS 312 will not prefer VoNR or the gNB 302 for terminating the call request. In response to the step 332 and receiving the congestion or unavailability information, the AS 312 will not send a request to the UDM 306 to terminate a call on the gNB 302 and the AMF 304. As such, the AS 312 prefers fallback options. Such fallback options include, but are not limited to, VoLTE or other communication protocols available.

Figure 4:
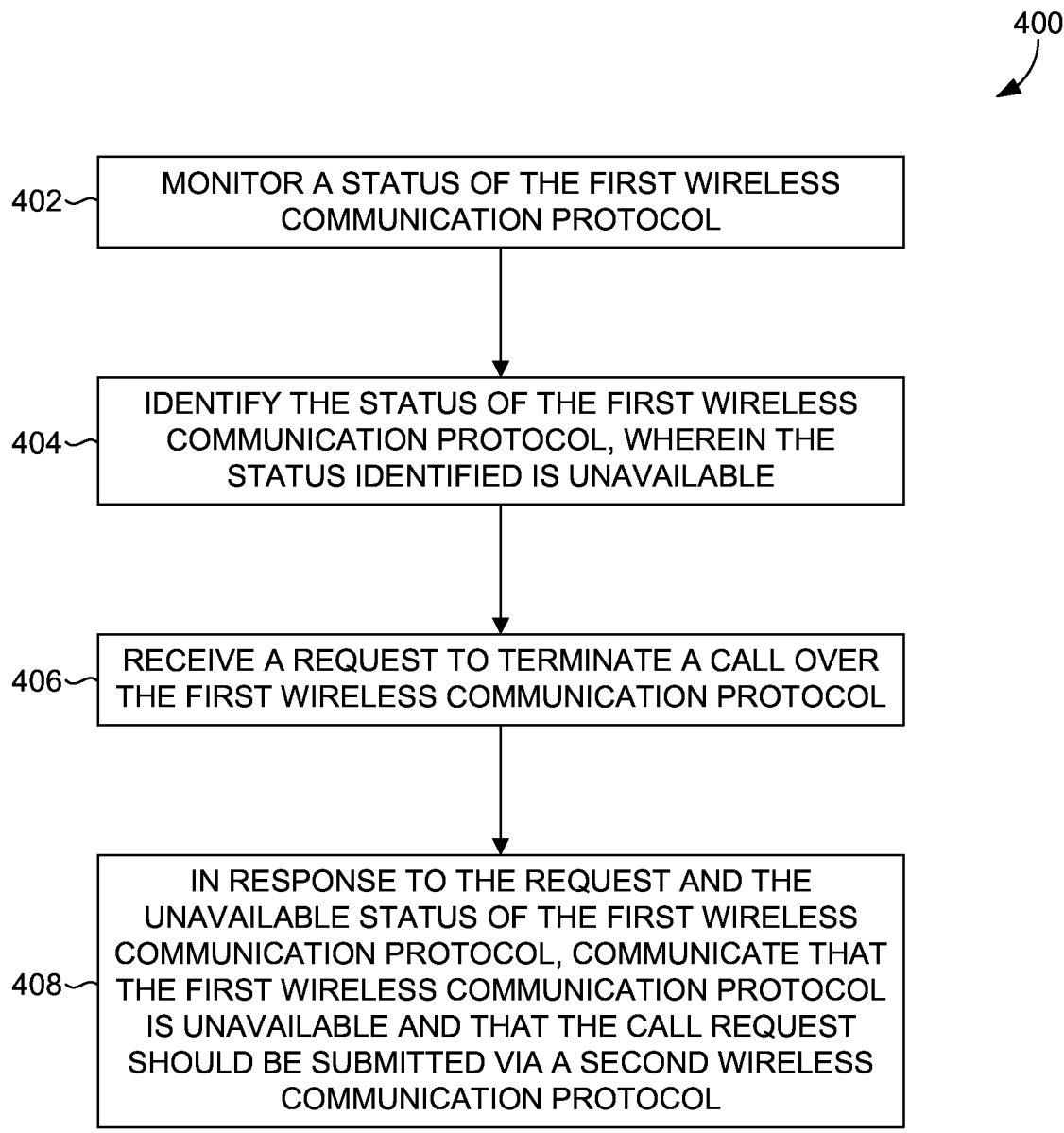
FIG. 4 depicts a flowchart of an exemplary method, in accordance with an embodiment of the present disclosure.

Referring to FIG. 4, a flowchart of an exemplary method 400 is illustrated for dynamically modifying the antenna elements associated with an overlapping back lobe of a base transceiver station, such as the base transceiver station 112 in FIG. 1. Initially at block 402, a status of the first wireless communication protocol is monitored at the base transceiver station. The first wireless communication protocol may be associated with a radio access network. At block 604, the status of the first wireless communication protocol is identified as unavailable. At block 606, a request to terminate a call over the first wireless communication protocol is received. At block 608, in response to the request and the unavailable status of the first wireless communication protocol, it is communicated that the first wireless communication protocol is unavailable and that the call request should be submitted via a second wireless communication protocol.

Figure 5:
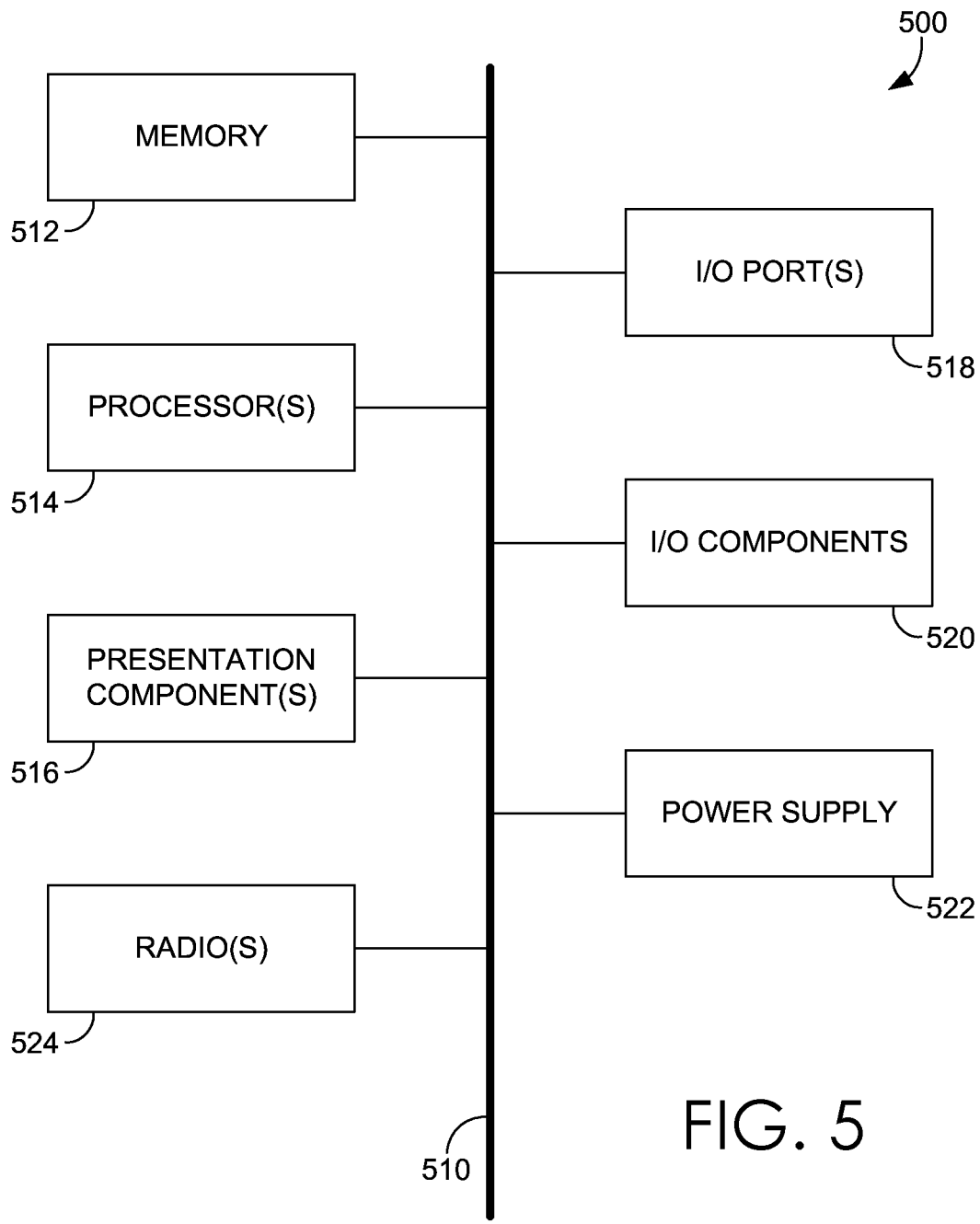
FIG. 5 depicts an exemplary computing device suitable for use in implementations of aspects described herein.

Referring now to FIG. 5, a diagram is depicted of an exemplary computing environment suitable for use in implementations of the present disclosure. In particular, the computer environment is shown and designated generally as a computing device 500. The computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The implementations of the present disclosure may be described in the general context of computer code or machine-useable instructions, including computer-executable instructions, such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, and the like. Implementations of the present disclosure may also be practiced in distributed computing environments where tasks are performed by remote-processing devices that are linked through a communications network.

With continued reference to FIG. 5, the computing device 500 includes bus 502 that directly or indirectly couples the following devices: memory 504, one or more processors 506, one or more presentation components 508, input/output (I/O) ports 510, I/O components 512, power supply 514 and radio(s) 516. The bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component, such as a display device to be one of I/O components 512. Also, processors, such as one or more processors 506, have memory 504. The present disclosure herein recognizes that such is the nature of the art and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and are referred to as "computer" or "computing device."

Computing device 500 typically includes a variety of computer-readable media. Computer-readable media can be any available media that can be accessed by the computing device 500 and includes both volatile and nonvolatile media, removable and non-removable media. By way of non-limiting example, computer-readable media may comprise computer storage media and communication media. Computer storage media includes both volatile and nonvolatile, removable, and non-removable media implemented in any method or technology for storage of information, such as computer-readable instructions, data structures, program modules, or other data.

Computer storage media includes RAM, ROM, EEPROM, flash memory or other memory technology, CD-ROM, DVD or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of non-limiting example, communication media includes wired media, such as a wired network or direct-wired connection, and wireless media, such as acoustic, RF, infrared, and other wireless media. Combinations of any of the above should also be included within the scope of computer-readable media.

The memory 504 includes computer-storage media in the form of volatile and/or nonvolatile memory. The memory 504 may be removable, non-removable, or a combination thereof. Exemplary memory includes solid-state memory, hard drives, optical-disc drives, etc. The computing device 500 includes one or more processors 506 that read data from various entities, such as bus 502, memory 504, or I/O components 512. One or more presentation components 508 presents data indications to a person or other device. Exemplary one or more presentation components 508 include a display device, speaker, printing component, vibrating component, etc. The I/O ports 510 allow the computing device 500 to be logically coupled to other devices, including the I/O components 512, some of which may be built in the computing device 500. Illustrative I/O components 512 include a microphone, joystick, game pad, satellite dish, scanner, printer, wireless device, etc.

The radio(s) 516 represents a radio that facilitates communication with a wireless telecommunications network. Illustrative wireless telecommunications technologies include CDMA, GPRS, TDMA, GSM, and the like. The radio(s) 516 might additionally or alternatively facilitate other types of wireless communications including Wi-Fi, WiMAX, LTE, or other VoIP communications. As can be appreciated, in various embodiments, the radio(s) 516 can be configured to support multiple technologies and/or multiple radios can be utilized to support multiple technologies. A wireless telecommunications network might include an array of devices, which are not shown so as to not obscure more relevant aspects of the disclosure. Components, such as a base transceiver station, a communications tower, or even access points (as well as other components), can provide wireless connectivity in some embodiments.

Many different arrangements of the various components depicted, as well as components not shown, are possible without departing from the scope of the claims below. Embodiments of this technology have been described with the intent to be illustrative rather than be restrictive. Alternative embodiments will become apparent to readers of the present disclosure. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. One or more non-transitory computer-readable media having computer-executable instructions embodied thereon that, when executed, perform a method for communicating a first status of a first wireless communication protocol, the method comprising:
    monitoring a status of the first wireless communication protocol within a first base station;
    determining, based on the status of the first wireless communication protocol, that the first wireless communication protocol has a congested status or an unavailable status;
    communicating, to a data repository, an indication of the congested status or the unavailable status of the first wireless communication protocol;
    receiving a request from a first user device to terminate a call over the first wireless communication protocol;
    determining that the first wireless communication protocol has the congested status or the unavailable status based on a query of the data repository; and
    in response to the request and the determination that the first wireless protocol has the congested status or the unavailable status, terminating the call using a second wireless communication protocol within the first base station.

2. The media of claim 1, wherein monitoring the status of the first wireless communication protocol comprises monitoring one or more performance indicators of the first wireless communication protocol.

3. The media of claim 2, wherein one or more performance indicators comprise at least one of an attach rate, a handover failure, an average throughput, and data usage.

4. The media of claim 1, wherein the first wireless communication protocol is 5G.

5. The media of claim 1, wherein the second wireless communication protocol is LTE.

6. The media of claim 1, wherein the first status of the first wireless communication protocol is stored on a database.

7. The media of claim 6, wherein the database is a unified data repository.

8. The media of claim 1, wherein the first wireless communication protocol is monitored by an access mobility function.

9. A method for communicating a first status of a first wireless communication protocol, the method comprising:
    monitoring a status of the first wireless communication protocol within a first base station;
    determining, based on the status of the first wireless communication protocol, that the first wireless communication protocol has a congested status or an unavailable status;
    communicating, to a data repository, an indication of the congested status or the unavailable status of the first wireless communication protocol;
    receiving a request from a first user device to terminate a call over the first wireless communication protocol;
    determining that the first wireless communication protocol has the congested status or the unavailable status based on a query of the data repository; and
    in response to the request and the determination that the first wireless protocol has the congested status or the unavailable status, terminating the call using a second wireless communication protocol within the first base station.

10. The method of claim 9, wherein monitoring the status of the first wireless communication protocol comprises monitoring one or more performance indicators of the first wireless communication protocol.

11. The method of claim 10, wherein one or more performance indicators comprise at least one of an attach rate, a handover failure, an average throughput, and data usage.

12. The method of claim 9, wherein the first wireless communication protocol is 5G.

13. The method of claim 9, wherein the second wireless communication protocol is LTE.

14. The method of claim 9, wherein the first status of the first wireless communication protocol is stored on a database.

15. A system for communicating a first status of a first wireless communication protocol, the system comprising a processor configured to:
    monitor a status of the first wireless communication protocol operating within a first base station;
    determine, based on the status of the first wireless communication protocol, that the first wireless communication protocol has a congested status or an unavailable status;

communicate, to a data repository, an indication of the congested status or the unavailable status of the first wireless communication protocol;

receive a request from a first user device to terminate a call over the first wireless communication protocol;

determine that the first wireless communication protocol has the congested status or the unavailable status based on a query of the data repository; and in response to the request and the determine that the first wireless protocol has the congested status or the unavailable status, terminate the call using a second wireless communication protocol within the first base station.

16. The system of claim 15, wherein the first wireless communication protocol is 5G.

17. The system of claim 15, wherein the second wireless communication protocol is LTE.

18. The system of claim 15, wherein the first status of the first wireless communication protocol is stored on a database.

19. The system of claim 18, wherein the database is a unified data repository.

20. The system of claim 15, wherein the first wireless communication protocol is monitored by an access mobility function.

* * * * *

UNITED STATES PATENT AND TRADEMARK OFFICE
CERTIFICATE OF CORRECTION

| | | |
|---|---|---|
| PATENT NO. | : 12,010,751 B1 | Page 1 of 1 |
| APPLICATION NO. | : 17/462599 | |
| DATED | : June 11, 2024 | |
| INVENTOR(S) | : Anil Kumar Mariyani et al. | |

It is certified that error appears in the above-identified patent and that said Letters Patent is hereby corrected as shown below:

In the Claims

Column 12, Claim 6, Line 16:
In the line reading "6. The media of claim 1, where the first status of the first" should read -- 6. The media of claim 1, where the status of the first --

Signed and Sealed this
Thirtieth Day of July, 2024

Katherine Kelly Vidal
*Director of the United States Patent and Trademark Office*